United States Patent [19]

Rapps

[11] 4,025,011
[45] May 24, 1977

[54] SPRING HANGER ASSEMBLY

[76] Inventor: John W. Rapps, 1683 Westervelt Ave., Baldwin, N.Y. 11510

[22] Filed: Sept. 12, 1975

[21] Appl. No.: 612,720

[52] U.S. Cl. .............................. 248/54 R; 267/69; 267/168
[51] Int. Cl.² .......................................... F16L 3/00
[58] Field of Search ............... 267/69, 70, 72, 178, 267/168; 248/54 R, 54 CS, 58, 60, 8, 15, 20, 204, 358 AA; 211/113; 174/42

[56] References Cited

UNITED STATES PATENTS

| 2,363,538 | 11/1944 | Loepsinger | 267/60 |
| 2,480,487 | 8/1949 | Loepsinger | 248/54 R |
| 2,756,014 | 7/1956 | Leibfried | 248/54 CS |
| 2,873,078 | 2/1959 | Suozzo | 248/54 R |
| 3,148,870 | 9/1964 | Suozzo | 248/54 R |

FOREIGN PATENTS OR APPLICATIONS 697,987  10/1953  United Kingdom ............ 248/54 R Primary Examiner—James B. Marbert
Attorney, Agent, or Firm—Herbert L. Lerner

[57] ABSTRACT

A spring hanger assembly for suspending pipelines includes spring carrying means attachable to a supporting structure, a first sprung member carried by the spring carrying means, a second sprung member carried by the first sprung member, and locking means for releasably securing the second sprung member and the spring carrying means against movement relative to one another and thereby securing the first sprung member against movement relative to the spring carrying means and the second sprung member.

6 Claims, 5 Drawing Figures

U.S. Patent May 24, 1977 4,025,011
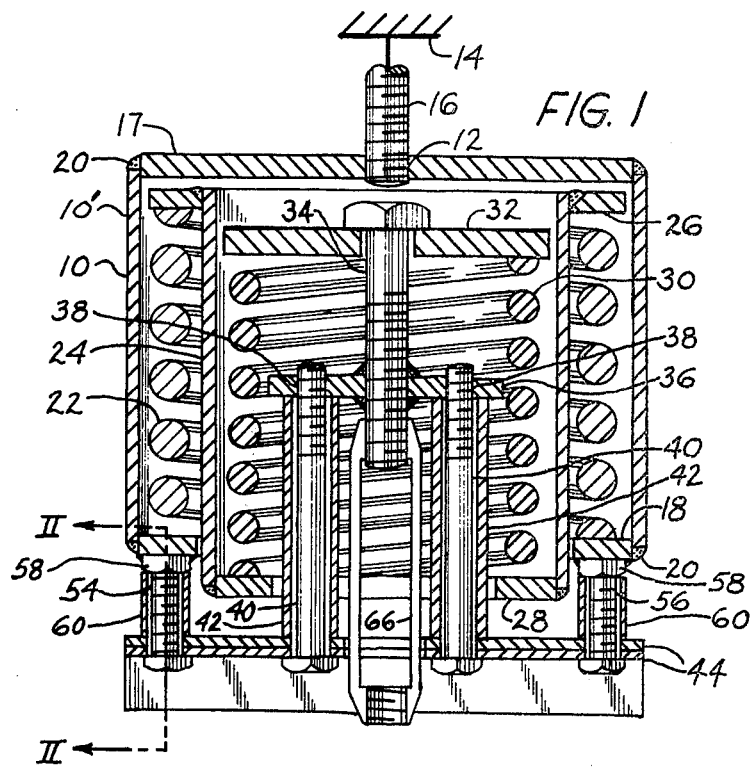
FIG. 1
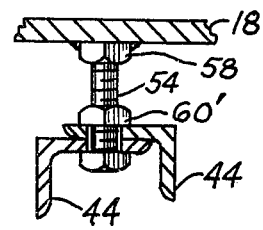
FIG. 2
FIG. 5
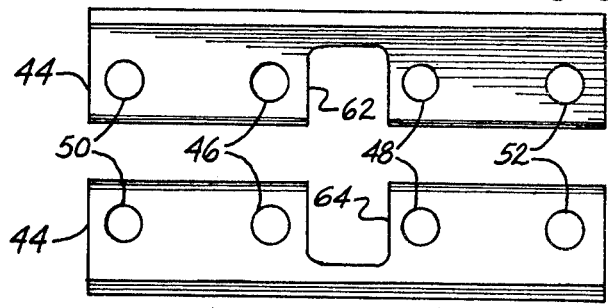
FIG. 3
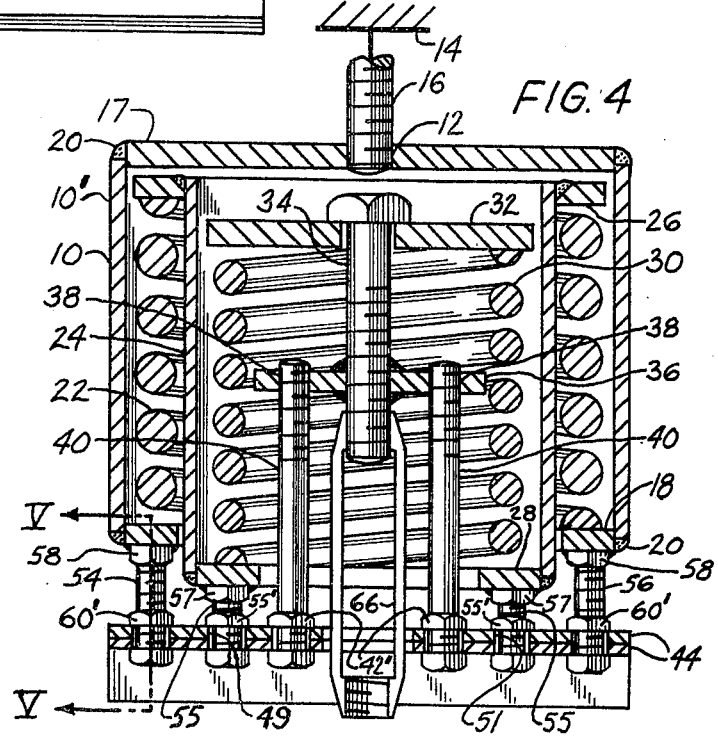
FIG. 4

SPRING HANGER ASSEMBLY

The invention of the instant application relates to a spring hanger assembly and more specifically to spring hangers formed with a plurality of coaxially mounted, substantially helical springs and installed in spaces having a limited headroom or vertical dimension.

Spring hangers are utilized advantageously when a given load supported by the hangers is subjected to a range of movement which is foretellable with reasonable accuracy and mathematical precision. An especially pressing need or such spring hangers is to support pipeline systems that conduct fluids having a temperature that varies and consequently produces movement in one or more of the pipes in the systems. Vertical risers are incorporated into most of such pipeline systems, and horizontal pipes extend from those risers. Due to expansion or contraction of the vertical risers, as a result of temperature variation in the fluids traveling therethrough, vertical displacement of the horizontal pipes is produced, the magnitude of displacement thereof being mathematically predictable to any man of ordinary skill in the art. If the magnitude of the displacement or movement of the horizontal pipes is relatively large or the available space between the pipeline system or load of the spring hanger and a fixed structural support is limited, a hanger formed with coaxially disposed, substantially helical springs of the type which is the subject of the invention of the instant application will provide adequate support within a widely varying range of conditions.

It has been found, however, that, when installing the heretofore known pipe hangers of the foregoing type in situ, considerable time is spent adjusting the compression of the springs which is often between three and four times the unit spring coefficient. This precompression of the springs is required in accordance with the invention in order to obtain a predetermined, but variable, supporting force between the pipe per se and its rigid structural attachment point in order to support, absorb and cushion such pipes from the aforementioned movement due to fluid temperature variations. Precompression provides additionally, the shortest possible working length of the coaxially mounted springs so that there is a minimum intrusion by the pipe hanger into the headroom space between the structural attachment point of the pipe hanger and the pipe per se that is to be suspended therefrom.

As is often the case, the headroom available for the installation of a pipe hanger is rather limited so that the shorter an effectively functioning pipe hanger is, the more suitable it is for universal application. However, as aforementioned, setting or adjusting the compression of the springs of a pipe hanger of the foregoing type at the location at which it is to be installed is time-consuming and often very trying because the conditions in situ are frequently extremely uncomfortable in that it is often too cold, too hot, too damp, too dark, too confined and the like at the installation location and, due to the fact that the magnitude of the compression is as much as several force-tons, extensive and awkward special equipment is required to provide the compressive adjustment. It is accordingly an object of the invention to provide a pipe hanger assembly in which the compression of the springs is factory preset with accurate equipment under optimum working conditions and the preset compression is suitably maintained during the shipment, shelf-life and testing of the pipe hanger which is installable in situ with only a minimum length adjustment.

It is another object of the invention to provide a pipe hanger assembly which is readily disassemblable in situ to provide an immediately functioning pipe hanger.

It is a further object of the invention to provide a pipe hanger assembly that has as few parts as possible that must be removed in order to provide a suitably functioning pipe hanger It is an additional object of the invention to provide a pipe hanger assembly with releasable locking means that will secure the supported pipe during its erection and testing when it may be subjected to overloading to a multiple of 2 times rated load that might otherwise overstress and overcompress the working capacities of the coaxially mounted springs.

It is an added object of the invention to provide a pipe hanger assembly with releasable locking means that will be failsafe against overtravel or overcompression of the inner coaxial spring for the lifetime of the pipe hanger installation.

It is yet another feature of the invention to provide a pipe hanger and releasable locking assembly according to the invention wherein the means for maintaining the preset compression of the springs thereof are formed of relatively inexpensive parts, at least some of which are standard components readily available in the trade.

With the foregoing and other objects in view, there is provided, in accordance with the invention, a spring hanger assembly for suspending pipelines comprising spring carrying means attachable to a supporting structure, a first sprung member carried by the spring carrying means, a second sprung member carried by the first sprung member, and locking means for releasably securing the second sprung member and the spring carrying means against movement relative to one another and thereby securing the first sprung member against movement relative to the spring carrying means and the second sprung member.

In accordance with more specific features of the invention, the spring hanger assembly for suspending pipelines comprises an outer compression spring, an outer casing having at one end thereof means for attaching the outer casing to a supporting structure, and having at the other end thereof an inwardly extending flange supporting the outer compression spring at one end of said spring; an inner compression spring disposed within and coaxial with the outer compression spring; an inner casing having at one end thereof an outwardly extending flange bearing on the outer compression spring at the other end of the outer compression spring, the inner casing having at the other end thereof an inwardly extending flange supporting the inner compression spring at one end of the inner compression spring, a pipeline suspension assembly disposed coaxially within the inner casing and having means bearing on the inner compression spring at the other end thereof; and locking means for releasably securing the pipeline suspension assembly and the outer casing against movement relative to one another whereby the inner and outer spring and the inner casing are also releasably secured against movement relative to one another and to the pipeline suspension assembly and the outer casing.

Other features which are considered as characteristic for the invention are set forth in the appended claims.

Although the invention is illustrated and described herein as embodied in a spring hanger assembly, it is nevertheless not intended to be limited to the details shown, since various modifications and structural changes may be made therein without departing from the spirit of the invention and within the scope and range of equivalents of the claims.

It is also within the scope of this invention to provide a pipe hanger assembly with more than two coaxially disposed springs and corresponding casings lockable by the releasable locking assembly according to the invention.

The construction and method of operation of the invention, however, together with additional objects and advantages thereof will be best understood from the following description of specific embodiments when read in connection with the accompanying drawings, in which:

FIG. 1 is a longitudinal sectional view of the pipe hanger assembly with releasable locking means of the invention of the instant application;

FIG. 2 is a fragmentary sectional view of FIG. 1 taken along the line II—II in direction of the arrows;

FIG. 3 is an exploded plan view of the two angle strips forming part of the pipe hanger assembly with releasable locking means of FIG. 1;

FIG. 4 is a view similar to that of FIG. 1 of another embodiment of the pipe hanger assembly with releasable locking means of the invention; and FIG. 5 is a fragmentary sectional view of FIG. 4 taken along the line V—V in direction of the arrows.

Referring now to the drawing and first, particularly, to FIG. 1 thereof there is shown a spring hanger according to the invention in longitudinal sectional view having an outer cylindrical casing 10 securable to a structural anchor 14 by a threaded rod 16 extending downwardly from the latter. The threaded connection 12, 16 is only one basic form of structural attachment, and any other means of attachment equally well know to the man of ordinary skill in the art, may be employed in place thereof, for example, lugs of the single or double type or direct weldment or bolting of the casing 10 to the structural anchor 14 may be used as attachment means. The casing 10 is in the form of a canister, with a flat ring 18 and a flat plate 17 extending radially inwardly from the peripheral edge of the casing 10 at the bottom open end and the top open end, respectively, thereof, as viewed in FIG. 1. The ring 18 and the plate 17 may be secured to the edge of a sleeve 10' by welds 20 or by any other suitable means. A first, outer helical spring 22 having a diameter somewhat smaller than that of the outer casing 10 is mounted therein and supported at one end thereof on the peripheral ring 18. An inner canister or sleeve 24 is mounted coaxially to the outer casing 10 and the outer helical spring 22 and is formed with a peripheral, radially outwardly extending flat ring 26, secured to the upper peripheral edge of the sleeve 24, as viewed in FIG. 1, in an manner similar to that by which the ring 18 is secured to the casing 10. The ring 26 bears on the upper end of the outer spring 22, as viewed in FIG. 1. The sleeve 24 is also provided with a peripheral radially inwardly extending flat ring 28 at the lower peripheral edge thereof, as viewed in FIG. 1, the ring 28 being secured to the sleeve 24 in a similar manner as the ring 26.

An inner helical spring 30 is disposed coaxially to the outer casing 10, the outer spring 22 and the sleeve 24 and is supported on the radially inwardly extending ring 28. A circular plate 32 is formed with a central bore through which a bolt-like piston rod 34 extends. The piston rod 34 further extends through a central internally threaded bore formed in another, though smaller, circular plate 36 and is threadedly secured and welded thereto as shown in FIG. 1. The circular plate 36 may be replaced by a channel member or the like. The circular plate 36 is formed with threaded bores 38 adjacent the peripheral edge thereof in which elongated bolts 40 are respectively threaded. The bolts 40 extend through respective spacer sleeves 42 which space the circular plate 36 from a pair of superimposed angle lengths or strips 44 as shown more clearly in the fragmentary sectional view of FIG. 2. The angle strips 44, as shown in an exploded plan view thereof in FIG. 3, are formed with mutually alignable bores 46 and 48 through which the bolts 40 respectively extend. The angle strips 44 are also formed with additional mutually alignable bores 50 and 52 through which other bolts 54 and 56, shorter than the bolts 40, extend. The bolts 54 and 56 are threaded in respective nuts 58 that are welded to the outside of the ring 18. Instead of having the nuts 58 being welded to the ring 18 the latter may simply be formed with respective threaded bores. Spacer sleeves 60 surround the bolts 54 and 56, respectively and, at opposite ends thereof, engage the nuts 58 and the superimposed angle strips 44. The channel strips 44 are provided with respective central cut-outs 62 and 64 as shown in FIG. 3 which, together, form a fully defined hole 62, 64 when the angle strips 44 are mutually superimposed as shown in FIG. 2. A turnbuckle 66 is threaded at one end thereof on the piston rod bolt 34 and extends through the opening 62, 64 formed in the superimposed angle strips 44.

The spring hanger assembly of the invention as illustrated in FIG. 1 may be assembled in the following manner:

The flat plate 17 is welded to one open end of a cylindrical sleeve 10' and, before the flat ring 18 is welded to the other open end of the sleeve 10', the outer cylindrical casing 10, thus formed, is up-ended so that the open side is at the upper end thereof. A subassembly of the circular plate 32 on the piston rod 34 to which the circular plate 36 has been welded and on which the turnbuckle 66 has been threaded is inserted centrally into the cylindrical casing 10 in inverted position from that shown in FIG. 1. The inner spring 30 of appropriate design is then disposed on the circular plate 32 coaxially to the piston rod 34. The sleeve 24 with the respective flat rings 26 and 28 prewelded to the opposite ends thereof is inserted into the inverted outer casing 10 so that the flat ring 28 rests on one end of the spring 30. The outer spring 22 of appropriate design, wound counter to the winding of the inner spring 30 as well as being formed with a wire guage greater than that of the inner sprng 30, is thereafter inserted into the outer casing 10 and around the inner sleeve 24 until it comes to rest on the flat ring 26 prewelded to the inner sleeve 24. With a suitable conventional fixture device and necessary mechanical or hydraulic force provisions applied simultaneously at the faces of the flat rings 28 and the as yet loose flat ring 18, the springs are then compressed until flat ring 18 is located at the edge of the open end of the outer cylindrical casing 10. The flat ring 18 is then welded to the edge of the outer casing 10 at the open end thereof. The angle strips 44 are superimposed on one another as viewed in FIG. 2, the various bolts 40, 54 and 56 are extended through the registering bores 46, 48, 50 and 52 formed in the angle strips 44, and the respective sleeves 42 and 60 are slid over the bolts 40 and 54, 56. Finally, the bolts 40 are threadedly secured in the threaded bores 38 formed in th circular plate 36, and the bolts 54 and 56 are threadedly secured in the threaded bores of the nuts 58 that are welded to the flat ring 18 of the outer casing 10.

The assembly of the invention thus provides a locking of a factory pre-set spring hanger for ready release in situ with minimal readjustment. In fact, at the point of use of the spring hanger, it can be made operational merely by unthreading the four bolts 40, 54, and 56, which are then easily removed from the spring hanger together with the sleeves 42 and 60 and the angle strips 44.

The circular plate 36 which, as aforementioned, may be replaced by a channel member or the like, serves also to prevent the inner compression spring 30 from being compressed to the solid height thereof i.e. to an extent that the coils thereof are in engagement with one another, and also to prevent total collapse of the pipe-supporting suspension if the inner compression spring 30 should fail, the plate 36 having a larger diameter than the opening in the flat ring 28 which is welded to the inner sleeve 24, so that the plate 36 becomes a so-called deadman stop and cannot pass through the aforementioned opening in the flat ring 28.

Another embodiment of the pipe hanger assembly according to the invention is shown in FIG. 4. Those features in the embodiment of FIG. 4 which are the same as those in the embodiment of FIG. 1 are identified by like reference numerals.

It will be noted that the spacer sleeves 42 and 60 of FIG. 1 have been dispensed within the embodiment of FIG. 4 and replaced by respective lock nuts 42' and 60' which are suitably threaded on the bolts 40 and 54 and 56, respectively, and, as shown in FIG. 4, effectively space the angle strips 44 from the plate 36, on the one hand, and form the flat ring or flange 18 of the outer cylindrical casing 10.

In the embodiment of FIG. 4, moreover, each of the angle strips 44 is formed with two additional registrable bores 49 and 51, respectively, through which additional bolts 55 extend and are threadedly secured in nuts 57 that are welded to the flat ring or flange 28 of the inner cylindrical casing 24. Lock nuts 55' are threadedly secured on the bolts 55 to space the inner cylindrical casing 24 from the angle strips 44.

In the fragmentary sectional view of FIG. 5, the manner of assembly of the bolts, locknuts and angle strips is clearly shown.

Disassembly of the present compression maintenance members form the pipe hanger embodiment of FIG. 4 is effected in the same manner described hereinabove with regard to the embodiment of FIG. 1, except that instead of removing bolts and spacer sleeves as in the embodiment of FIG. 1, bolts and locknuts are removed in the embodiment of FIG. 4.

There is claimed:

1. A spring hanger assembly for suspending pipelines comprising spring carrying means attachable to a supporting structure, a first sprung member carried by said spring carrying means, a second sprung member carried by said first sprung member, and locking means for releasably securing said second sprung member and said spring carrying means against movement relative to one another and thereby securing said first sprung member against movement relative to said spring carrying means and said second sprung member, and wherein said spring carrying means comprises an outer casing having at one end thereof means for attaching said outer casing to the supporting structure, and having at the other end thereof an inwardly extending flange, an outer compression spring supported by said inwardly extending flange, and an inner compression spring disposed within and coaxial with said outer compression spring, said first sprung member comprising an inner casing having at one end thereof an outwardly extending flange bearing on said outer compression spring at the other end of said outer compression spring, said inner casing having at the other end thereof an inwardly extending flange supporting said inner compression spring at one end of said inner compression spring, and said second sprung member comprising a pipeline suspension assembly disposed coaxially within said inner casing and having means bearing on said inner compression spring at the other end of said inner compression spring, said locking means releasably securing said pipeline suspension assembly and said outer casing against movement relative to one another, said inner and outer spring and said inner casing being thereby also releasably secured against movement relative to one another and to said pipeline suspension assembly and said outer casing and wherein said pipeline suspension assembly comprises a first plate member bearing on said inner compression spring at said other end of said inner compression spring, a rodshaped member extending from said first plate member coaxial to and within said inner compression spring, a second plate member secured to said rodshaped member and spaced from said first plate member, said second plate member having an area greater than that of the opening of said inwardly extending flange of said inner casing.

2. A spring hanger assembly according to claim 1 wherein said rodshaped member is threaded, and including a turnbuckle member adjustably threaded at the end of said rodshaped member remote from said first plate member, and having means for suspending a pipeline therefrom.

3. A spring hanger assembly according to claim 2 wherein said locking means for releasably securing said pipeline suspension and said outer casing against movement relative to one another comprises angle strip means having a substantially central opening through which said trunbuckle member is extensible, and means for threadedly locking said angle strip means to and spaced from said second plate member and said inwardly extending flange of said outer casing.

4. A spring hanger assembly according to claim 3 wherein said angle strip means comprises a pair of superimposed angle strips having a respective notch formed at the middle thereof, said angle strips being constructed as mirror images of one another, whereby said notches in super imposed position of said angle strips define said substantially central opening.

5. A spring hanger assembly according to claim 3 including spacer means for spacing said angle strip means from said second plate member and from said inwardly extending flange of said outer casing, said spacer means being disposed between said strip means, on the one hand, and said second plate member and said inwardly extending flange of said outer casing, on the other hand, when said angle strip means and said second plate member and said inwardly extending flange of said outer casing are locked to one another by said threadedly locking means.

6. A spring hanger assembly according to claim 3 wherein said threadedly locking means comprises a plurality of externally threaded rodshaped fasteners extending from said angle strip means and threadedly reveived in corresponding internally threaded bores formed at said second plate member and said inwardly extending flange of said outer casing, and a plurality of lock nuts respectively threaded on said rodshaped fasteners for locking said angle strip means to and spaced from said second plate member and said inwardly extending flange of said outer casing.

* * * * *